United States Patent [19]
Braun

[11] 4,121,890
[45] Oct. 24, 1978

[54] LASER RANGEFINDER TESTER

[75] Inventor: Leroy O. Braun, Marina del Rey, Calif.

[73] Assignee: Hughes Aircraft Company, Culver City, Calif.

[21] Appl. No.: 825,338

[22] Filed: Aug. 17, 1977

[51] Int. Cl.² .................. G01C 3/08; G01N 21/00
[52] U.S. Cl. ........................ 356/5; 350/96.15; 350/96.18; 350/104; 350/199; 356/72
[58] Field of Search .............. 356/5, 72; 350/104, 350/199, 201, 96.15, 96.18

[56] References Cited
U.S. PATENT DOCUMENTS

| | | | |
|---|---|---|---|
| 2,485,345 | 10/1949 | Ackerman | 350/201 |
| 3,407,715 | 10/1968 | McCutchen | 350/199 |
| 3,724,383 | 4/1973 | Gallaghan et al. | 350/96.18 |
| 3,875,422 | 4/1975 | Stolen | 350/96.18 |
| 3,914,052 | 10/1975 | Wiklund | 356/5 |
| 4,068,952 | 1/1978 | Erbert et al. | 356/5 |

Primary Examiner—S. C. Buczinski
Attorney, Agent, or Firm—Martin E. Gerry; Andra M. Finkel; W. H. MacAllister

[57] ABSTRACT

A thick lens or prism with at least one spherical shaped surface is utilized in conjunction with a glass fiber delay line to create a sensitivity, boresight and range accuracy test unit for a laser rangefinder, which test unit may be built into the laser rangefinder. This test unit performs laser rangefinder sensitivity and boresight tests in a small volume with relatively simple components having a minimum of weight making its incorporation into most laser rangefinders very practical.

12 Claims, 9 Drawing Figures

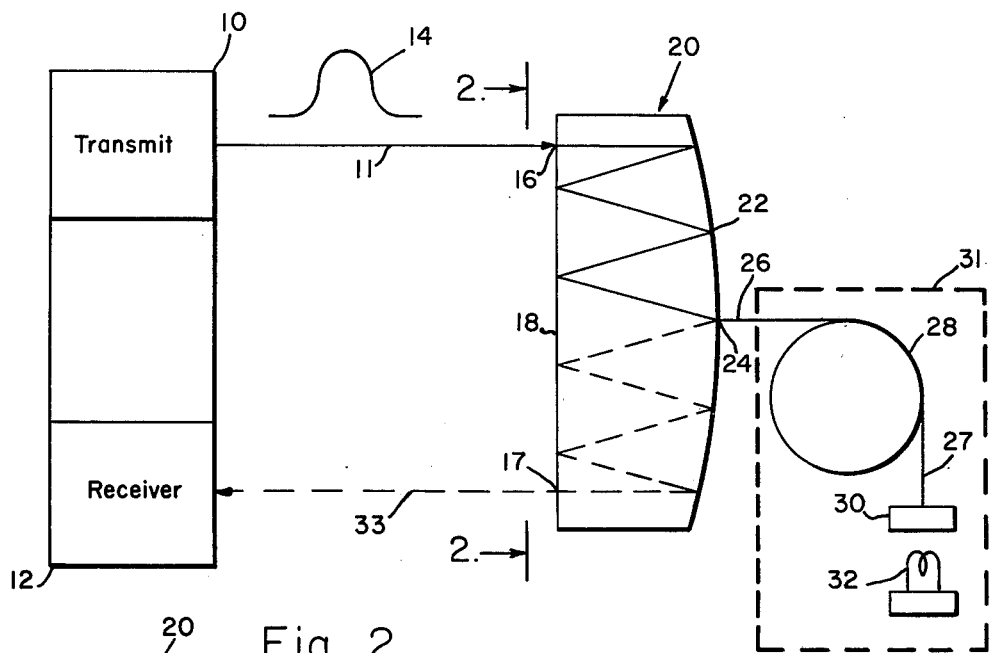
Fig. 1
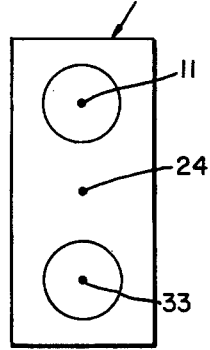
Fig. 2
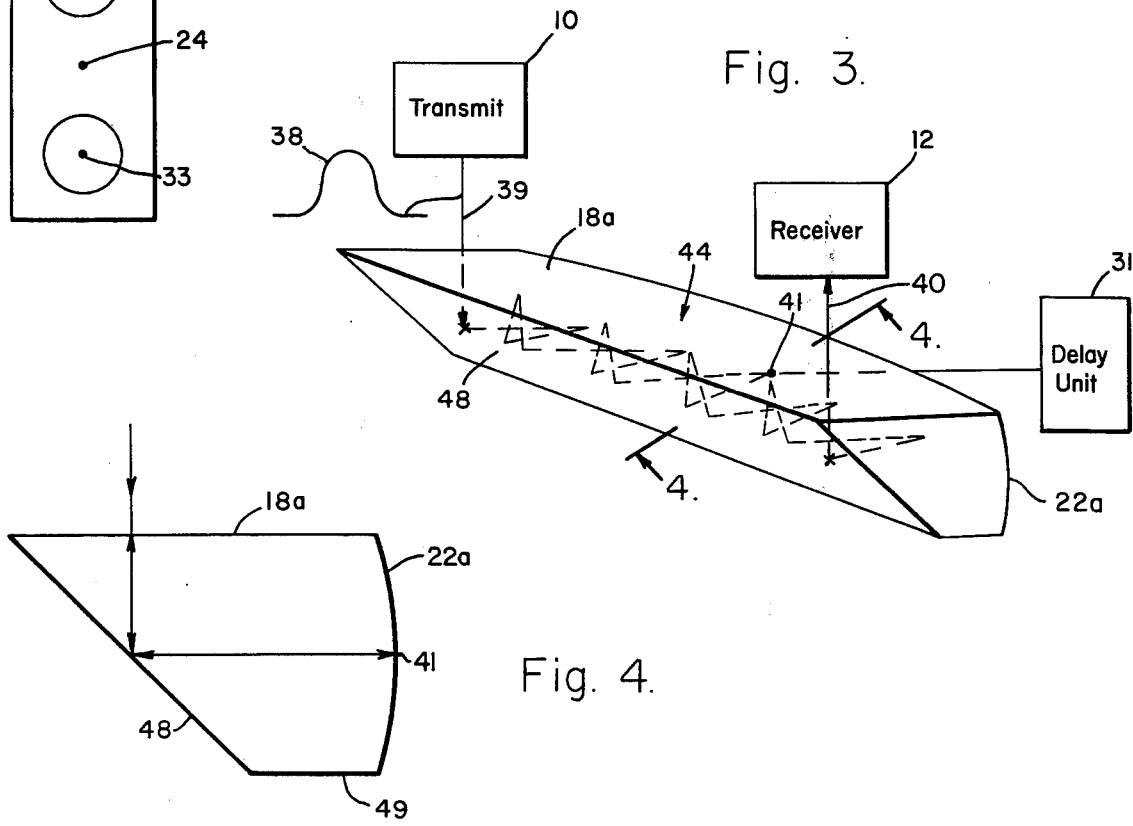
Fig. 3
Fig. 4

LASER RANGEFINDER TESTER

FIELD OF THE INVENTION

This invention relates to boresight and range testers for optical laser rangefinders, and particularly to a simulated optical range target unit utilizing fiber optics or optical waveguides and a thick lens or a prism structure to produce a signal light pulse from a single input source so as to provide both boresighting and range testing.

DESCRIPTION OF THE PRIOR ART

Conventionally, laser rangefinder boresight test arrangements are relatively large and cumbersome due to the area needed for transmitting light to and receiving light from a target. The boresight test unit is normally separate from the rangefinder unit. The prior art for a boresighting test unit consists of using a simple lens to focus the output of the laser transmitter onto a heat sensitive target. The reaction of the target material (typically a burned spot) is then viewed through the receiver optical path and through the same lens in which the transmitter energy had passed through. The relative position of the burned spot and the crosshairs in the visual path determine the degree of system boresight. Another type of test unit for testing range of a laser rangefinder utilizes a tapped fiber optic delay line but does not include the feature of highly accurate and simplified boresighting. A laser rangefinder boresight and range test unit that can eliminate the area needed to transmit and receive an optical signal from a target would be a substantial advantage to the art. Also, a laser rangefinder boresight and range test unit that would have constant reliable characteristics and could be utilized as a rangefinder sensitivity and accuracy test unit would be highly useful in the art.

It is therefore an object of this invention to provide a test unit that utilizes both fiber optics and a thick lens or prism structure to form a compact boresight tester.

It is another object of this invention to provide a simulated optical range target device that has consistent and constant transmission characteristics.

It is a further object of this invention to provide an optical range test unit for optical or laser rangefinders that not only tests the sensitivity and accuracy of the rangefinder and the boresight condition of the transmitter and receiver but also determines if the fiber optic line utilized in the test unit is operating properly (i.e. successful ranging cannot be accomplished with defective test unit).

It is another object of this invention to provide a boresight and range test unit that can be built internally as a part of the laser rangefinder or of its surrounding structure.

BRIEF DESCRIPTION OF THE DRAWINGS

The novel feature of this invention, as well as the invention itself, its method of organization and method of operation will be best understood from the accompanying description taken in connection with the accompanying drawing in which like reference characters refer to like parts and which:

FIG. 1 is a schematic diagram of one arrangement of the optical simulated range test laser unit, in accordance with the invention;

FIG. 2 is a schematic front view of the thick lens structure taken at lines 2—2 of FIG. 1;

FIG. 3 is a schematic diagram of another arrangement of the laser range test unit in accordance with the invention utilizing an illustrative prism structure;

FIG. 4 is a schematic sectional view of the prism structure taken at lines 4—4 of FIG. 3;

DESCRIPTION OF THE PREFERRED EMBODIMENTS

Figure 9:
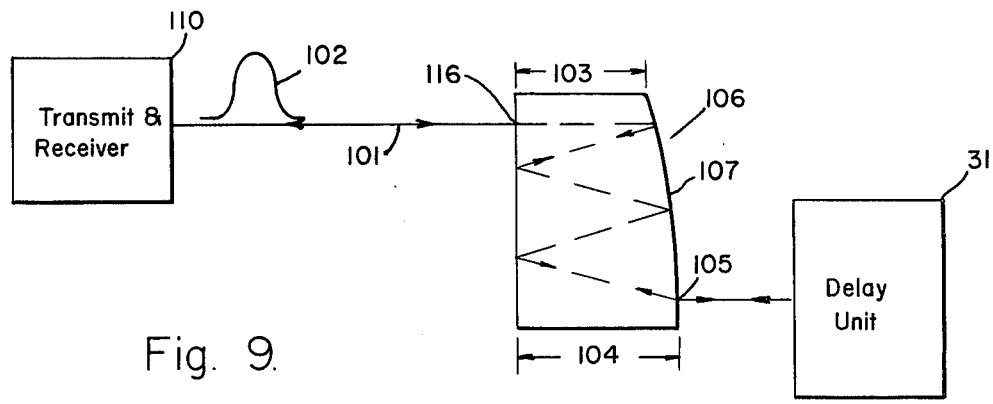
FIG. 9 is a schematic diagram of another arrangement of the laser rangefinder test unit in accordance with the invention utilizing a thick lens structure and a laser rangefinder having a common transmission and reception aperture.

Referring first to FIG. 1, the optical range boresight test unit in accordance with the invention operates with an optical rangefinder such as a laser rangefinder including a laser transmitter unit 10 and a laser receiver unit 12. A transmitted pulse or a signal of laser energy shown by a waveform 14 is applied from the transmitter 10 as a beam 11 to a first end 16 of a first surface 18 of an optical structure 20 such as, in this case, a thick lens having a spherical shaped surface 22. The pulse of the waveform 14 proceeds through the optical structure 20 to the second side surface 22 having a spherical shape. The illustrated path in FIG. 1 as well as in the other figures is that of a typical light ray. At the second side surface 22, some of the light is transmitted out of the optical means, but due to reflection a substantial portion of the light is reflected back toward the first surface 18. When the light again reaches the first surface 18 some of it is transmitted out of the optical means; but again a portion is reflected to the surface 22. This process may be repeated any desired number of times depending on the design configuration of the optical structure 20. Simultaneously the light is gradually being focused to a focal point, such as 24 due to the curved reflective surface 22. In practice the optical structure is designed to provide minimum beam diameter at the focal point 24 being just outside the optical means where it is injected as a beam into the input end 26 of a single optical fiber or optical waveguide 28 which may be a conventional glass optical glass fiber containing a step or a graduated change in the refracted index of the glass between the core and the outer regions such that the light propagated along the fiber is guided in the core region of the fiber. For the purpose of this invention, an optical fiber is to mean any optical waveguide glass fiber or fiber of any suitable material that will propagate signal energy along its length, and light or light energy means energy at any frequency such as in the optical infrared region or higher frequency region that can be propagated through the optical fiber as defined. The focal point (FP) may be defined as a point on the optical axis through which every ray which enters the lens parallel to the optical axis passes.

The waveform 14 that has been passed to the input end 26 of the optical fiber 28 is propagated down the length of the fiber to the second end 27, reflected off reflecting means or a mirror 30, which may be semi-reflective, and passed back through the length of the fiber, thus providing for a time delay necessary to produce a simulated target return and allow time for the laser receiver to recover from electrical transients produced by the laser transmitter when it is fired. The optical fiber 28 and the reflecting means 30 are included in a delay unit 31. Upon arriving back at the optical means 20, the typical light ray re-enters the optical surface 22, undergoes a series of reflections similar to those that occurred before entering the optical fiber 28, and emerges from the optical means at the second end 17 of the first surface 18 in a collimated beam 33 parallel to the input beam 11. This beam is then introduced into the laser rangefinder receiver 12 to produce a simulated range return pulse. A portion of the light re-entering the surface 22 is also reflected back to the path 11. It is also to be noted at this time that all light rays entering the thick lens structure 22 (or prism structures of the invention) at any point along its surface and passing to the focal point 24 and then back out of the lens structure are parallel and have the same time delay in the lens or prism structure. The surface 18 in some arrangements in accordance with the invention may be curved. However, even with a curved surface the input and output beams 11 and 33 are parallel. As can be seen in the side view of FIG. 2 the optical structure 20 may be rectangular, or may have any desired configuration in the view of FIG. 2 such as being circular.

It is also to be noted that the energy reflected from the surface 22 at focal point 24 and on to the receiver path 33 without passing through the optical line 28 occurs at a very short range and may either be gated out or ignored in the display of the receiver 12. The thick lens structure 22 is illustrated with five paths on each side of the focal point 24 with each bounce on the surface 18 transmitting some energy that may possibly be received by the receiver 12. However, the energy from the bounces other than that forming the beam 33 are out of focus or not collimated or parallel so energy is not effective to trigger the receiver 12.

In practice the portion of the optical means 20 where reflections occur after propagation through the optical fiber would probably be coated to form a higher reflectivity surface to minimize light attenuation, whereas the portion of the optical means 20 where reflections occur before propagation through the optical fiber may or may not be coated depending on acceptable attenuation levels produced by the optical means 20.

To produce a useable device one additional element is necessary, an arrangement to align the laser rangefinder to the optical structure 20 and optical fiber assembly. As shown in FIG. 1 a light source 32 is placed behind the reflecting means 30, which is semi-reflective. Light from this source 32 which may be a filament source or light emitting diode source, for example, then propagates through the optical fiber 28, through the optical means, and to the laser rangefinder receiver along the same optical path as for the laser light. Since most laser rangefinders have a visual sighting system incorporated into the receiver, the user merely views the light through the receiver and aligns the receiver axis to the light. The transmitter is then fired and if the transmitter and receiver are boresighted a sufficient portion of the transmitted light will reflect to the focal point being at the entrance aperture of the optical fiber and will enter the optical fiber to subsequently be detected by the receiver. If the boresight is inadequate, the focal point of the light will not be at the entrance aperture of the optical fiber and the receiver will not receive sufficient light for detection. Also in some laser rangefinder systems, a visual sighting system may be incorporated in the transmitter and alignment of the transmitter and receiver axis may be performed thereby.

Referring now to FIG. 3, a transmitted pulse of signal energy of a waveform 38 enters a first surface 18a of a prism structure 44, reflects off a diagonal surface 48 and propagates to the second surface 22a which has a spherical configuration. At the second surface 22a, some of the light is transmitted out of the prism but due to reflection a portion of the light is reflected back toward the diagonal surface 48 and subsequently back toward the first surface 18a. When the light reaches the first surface 18a again some of it is transmitted out of the lens but a portion of it is reflected. This process may be repeated any desired number of times, depending on the design of the prism structure. Simultaneously, some of the light is gradually being focused due to the spherically curved reflective surface 22a. In practice the prism is designed to provide minimum beam diameter with a focal point 41 just outside the prism where it is injected as a beam into the optical fiber 26 end and into delay unit 31 similar to that shown in FIG. 1. When the beam reflects back to the prism, the light reenters the prism undergoing a series of reflections similar to those that occurred before entering the delay unit 31 and emerges from the prism as a beam 40. This beam 40 is then introduced into the laser rangefinder receiver to produce a simulated range. The sectional view of FIG. 4 further illustrates the reflection of a typical ray from three surfaces 18a, 22a and 48. A structural surface 49 is not utilized as a reflective surface. As explained relative to FIG. 1, the surfaces such as 18a and 48 may be curved, all within the scope of the invention. Thus the concept in accordance with the invention includes an optical structure with one reflective surface having a spherical shape or configuration and at least one additional reflective surface which may be flat or have a curved configuration.

In both the arrangements of FIGS. 1 and 3 the laser transmitter 10 and receiver 12 are tested as to their boresight or alignment condition because the input and output beams such as 11 and 33 or 39 and 40 are parallel because of the optical structure and the receiver will not indicate reception if the transmitter and receiver are not parallel. Thus, for example, if the receiver is aligned in response to the light source 32 and the visual path 33, then if the transmitter is not boresighted, the light ray transmitted in path 11 will not enter the receiver for energy detection because the paths 11 and 33 are always parallel. By selecting the length of the optical fiber 28 of the delay unit 31, any desired range may be tested. It is to be noted that the delay in the optical fiber 28 is additive to the delay in the optical lens or prism. The principles of the invention are not to be limited to a single delay time but switchable variations (not shown) may be provided outside of the optical structure such as in the delay unit 31 for providing different time delays or ranges.

Figure 5:
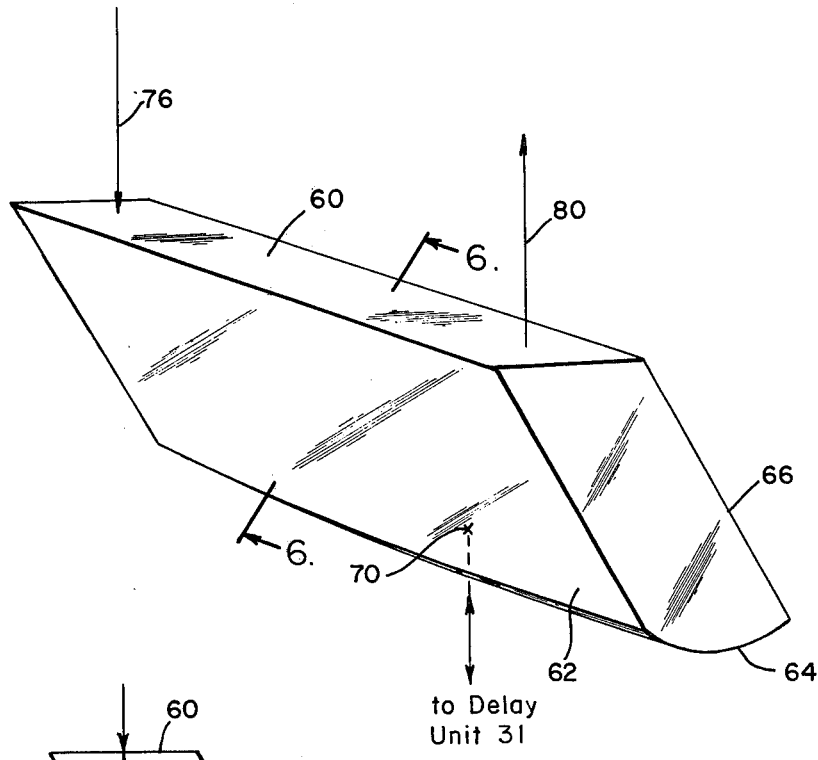
FIG. 5 is a schematic diagram of another arrangement of the laser rangefinder test unit in accordance with the invention showing a prism structure in which light rays are reflected from four surfaces for further illustrating that the concepts of the invention are equally applicable to any thick lens or prism structure having at least one spherical shaped reflective surface and at least one additional reflective surface.
Figure 6:
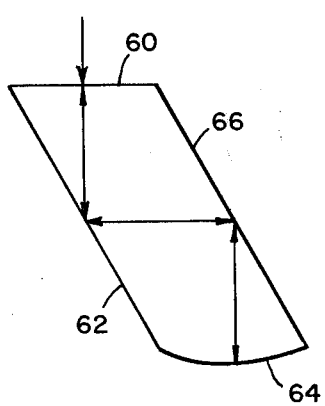
FIG. 6 is a schematic sectional view taken at line 6—6 of FIG. 5.

To illustrate that the concepts of the invention are not to be limited to any particular optical or prism configuration, FIG. 5 and the section of FIG. 6 show a prism structure having a top surface 60 through which a typical ray from the transmitter passes along a beam 76 to be reflected from a surface 62 which may be flat or curved. The light ray then passes to a surface 66 which also may be flat or curved and is then reflected to a surface 64 which is a spherical shaped surface. The light ray then reflects from the spherical surface 64 to a surface 66 and is then reflected to the surface 62. These reflections continue in a similar manner to a focal point 70 on or near the surface 64 and the typical ray passes through the end 26 of the fiber optic line to the delay unit 31 and is then reflected back to the focal point 70. The reflections then continue being directed by the spherical surface 64 so that the same number of bounces occur to the right of the focal point 70 as occurred to the left of the focal point 70. As a result the ray passes through the surface 60 as a beam 80 which is parallel to the beam 76. The illustrated reflection paths are symmetrical around the focal point 70 because of the focal point being positioned at the center of the spherical surface 64.

Figure 7:
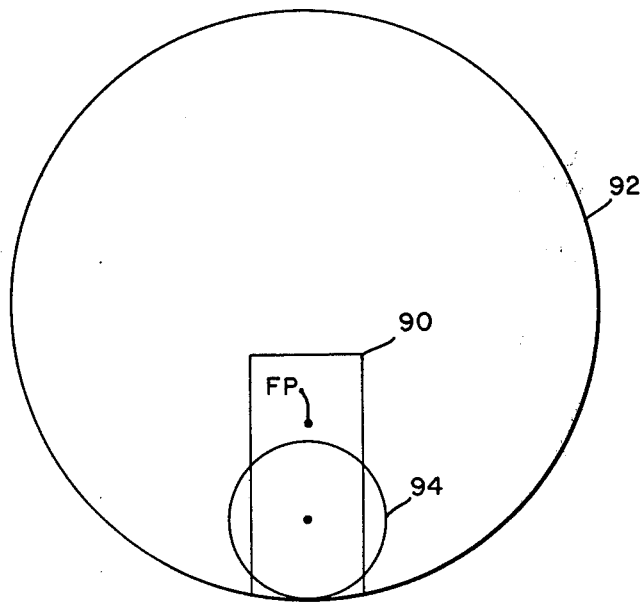
FIG. 7 is a schematic illustration of a laser rangefinder having the transmitter optical path included within but as a relatively small portion of the receiver optical path and showing the relative position of the range test unit.

Referring now to FIG. 7, a front view laser rangefinder is illustrated with an optical structure of any type in accordance with the invention, covering only a portion of the receiver optical beam path of a circle 92 and with a transmitter optical beam path of a circle 94 positioned at one end of the optical structure 90. Because all transmitted rays entering the structure 90 pass through the focal point (FP) and leave the structure 90 parallel to the input beam and with the same time delay, the system of the invention operates with the illustrated laser rangefinder optical configuration.

Figure 8:
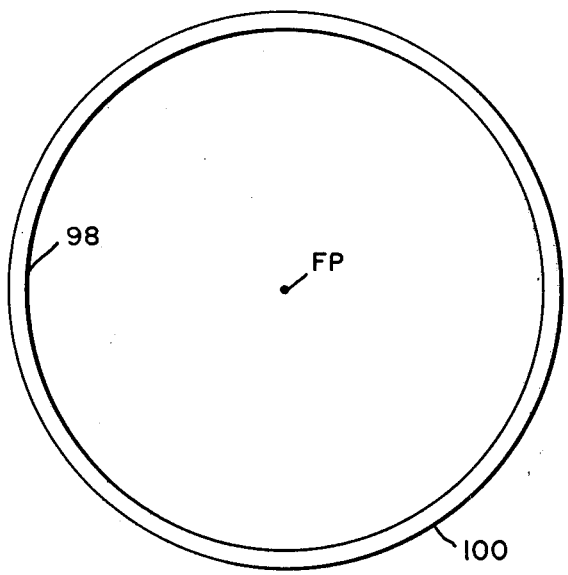
FIG. 8 is a schematic illustration of a laser rangefinder having a common transmission and reception aperture and in which the optical structure of the invention may encompass substantially the entire rangefinder aperture.

Referring now to FIG. 8, a front view laser rangefinder is shown with the transmitter and receiver being coincident as shown by a circle 98. Also in the circle 98 is a circular configuration of the thick lens structure 20 of FIG. 1 with a focal point (FP) in the center, the thick lens being illustrated by a circular line 100. The thick lens 100 is coupled to the delay means 31 of FIG. 1 at the focal point (FP). Because all transmitted rays pass through the focal point (FP) and the transmitter and receiver beams are parallel into and out of the optical lens structure, the range and boresight testing as well as the alignment is provided. Also, all rays entering and leaving the lens structure in parallel have the same time delay.

Referring now to FIG. 9 the optical range test unit in accordance with the invention operates with an optical range finder such as a laser range finder including a combined laser transmitter unit and laser receiver unit 110. A transmitted pulse or a signal of laser energy shown by a waveform 102 is applied from the laser transmitter aperature as a beam 101 to the first end of a first surface 116, which may be flat or circular, of an optical structure 106 and the pulse of the waveform 102 proceeds through the optical means 106 to the second surface 107 having a spherical shape. The illustrated path in FIG. 9 is that of a typical ray. At the second side surface some of the light is transmitted out of the optical means. Due to reflection a substantial portion of the light is reflected back toward the first surface. When the light again reaches the first surface some of it is transmitted out of the optical means but again a portion is reflected to the second surface. This process may be repeated any desired number of times depending on the design configuration of the optical structure 106. Simultaneously, the light is gradually being focused due to the curved reflective second surface 107. The optical structure is designed to provide minimum beam diameter with the focal point 105 being just outside the optical means where it is injected to delay unit 31 similar to that shown in FIG. 1. When the beam reflects back to the prism the light re-enters the prism undergoing a series of reflection similar to those that occur before entering the delay unit 31 and emerges from the optical means as beam 101 at the same first surface. This beam 101 is then introduced into the laser rangefinder receiver to produce a simulated range. It enters through the same aperture as was used to transmit the waveform 102. This transmitter receiver unit is similar to the one shown in FIG. 8. In this case widths 103 and 104 are such that 104 is greater than 103 and the second surface 107 between them is spherically curved.

The sensitivity testing by the rangefinder in accordance with the invention results from there being a certain fixed attenuation in the test structure and transmitter and receiver must have a maximum allowable pulse loss in order to be detected and for the rangefinder to be properly operating. If that maximum allowable loss in the ranger under test is greater than the attenuation of the test set, when boresighted, then the laser rangefinder will detect a simulated return.

Thus, there has been described a fiber optic device which produces a single light pulse from a single input light pulse for a rangefinder accuracy, sensitivity and boresight range test unit that has been compacted in size and this arrangement, in accordance with the invention, a predetermined range is provided. The optical structure is not limited to any particular configuration in accordance with the invention but requires a spherical shaped surface and at least one additional surface. Because the laser range boresight test unit of the invention is a passive internal device, it has substantially constant and nonvariable characteristics.

Detailed Optical Device Design Procedure

In practice, to optimally design an optical device for boresight testing, several characteristics of the laser rangefinger that is to be tested must be considered. These characteristics are:

Transmitter beam divergence,
Receiver field of view, and
Transmitter and receiver clear apertures and placement. For maximum transmitter to receiver boresight accuracy, consistent with minimum or near-minimum attenuation of the light as it passes into the fiber and into the receiver, it is necessary to have the diameter of the transmitted beam or the receiver field of view (whichever is less) at the focal point equal to the fiber core diameter. This determines the effective focal length of the optical device.

Also, for minimum loss and maximum repeatability it is desirable to have the entire transmitter clear aperture enter the optical device, although only a portion of the receiver clear aperture is required. These considerations determine the cross-sectional size of the optical device.

Considering the simplest optical device for this application, the thick lens shown in FIG. 1, the lens thickness and radius of curvature of the spherical surface must be determined. To accomplish this task the use of a computer with a program capable of optimizing multi-element optical systems is desirable.

Using computer analysis the multiple internal reflections off the two surfaces is equated to an equivalent number of separate reflective surfaces which are more conducive to analysis.

In addition to satisfying the above-mentioned parameters it is also necessary to keep system abberation small compared to fiber diameter. This will necessitate several internal reflections. The more reflections the smaller the abberations (because the surface curvatures are less for a given equivalent focal length) but also the greater the distortions due to surface imperfection and the greater the reflection losses. The computer is a practical method for evaluating these effects.

With the appropriate number of reflections chosen, using the computer solving for lens thickness and surface curvature are straightforward.

A typical program that may be used to perform this design is a commercially available program called Accos V available from scientific calculation Inc., Rochester, N.Y.

What is claimed is:

1. A laser rangefnder tester having a signal transmission path and a signal reception path comprising:
   (a) optical means having at least first and second surfaces, the first surface having a first and a second end position, the second surface being spherically curved;
   (b) signal transmission means positioned to direct energy in said signal transmission path to said first end position of said first surface;
   (c) an optical waveguide having a first and second end, the first end receiving said energy from the center of said second surface;
   (d) reflecting means positioned at the second end of said optical waveguide for reflecting said signal transmission energy back to the center of said second surface;
   (e) a light source positioned behind said reflecting means to provide a fiducial mark to align the relative positions of the laser rangefinder and said optical means; and
   (f) signal reception means positioned to receive said energy from said second end position of the first surface of said optical means.

2. The combination of claim 1 in which said optical waveguide is selected with a predetermined length representing a specified range.

3. The combination of claim 1 in which said optical means is a thick lens having a curved first surface.

4. The combination of claim 1 in which said optical means is a prism.

5. The combination of claim 1 in which the first and second end positions of the optical means are the same such that the signal transmission means transmits and the signal reception means receives said energy from the same end positions.

6. A test device for a rangefinder including transmission means having a transmission path and reception means having a reception path, said reception means displaying a signal received in said reception path comprising:
   (a) optical means, optically coupled to the rangefinder, said optical means having a first surface and a spherically curved second surface, said first surface having a first selected area positioned in said transmission path and a second selected area positioned in said reception path;
   (b) a fiber optic line having a first end and a second end and optically coupled to the optical means;
   (c) reflecting means positioned at the second end and optically coupled to said second end; and
   (d) a light source positioned behind and optically coupled to said reflecting means to provide a fiducial mark for aligning the relative positions of the rangefinder and said optical means.

7. The device of claim 6 in which said fiber optic line is separated of a length to provide a predetermined range.

8. The device of claim 6 in which said optical means is a thick lens.

9. The combination of claim 6 in which said optical means is a prism.

10. A test system for a laser rangefinder having a signal transmission path and a signal reception path comprising:
    (a) an optical structure having at least first and second surfaces with said at least first surface having a spherical configuration, said structure being positioned to receive energy from said signal transmission path at said second surface and to transfer energy to said signal reception path at said second surface, said structure having a focal point positioned on said first surface;
    (b) optical waveguide means having two ends, one end of said two ends being positioned at said focal point position; and
    (c) reflective means positioned at a second of said tow ends of said optical waveguide means.

11. The combination of claim 10 in which said optical structure also has third and fourth surfaces with the first, second and third surfaces reflecting said energy, said second surface having first and second end positions, the first end position receiving energy from said signal transmission path, the second end position transferring energy from said optical structure to said signal reception path, said focal point on said first surface of the structure being positioned between said first and second end positions.

12. The combination of claim 10 wherein said optical structure has first, second, third and fourth surfaces for reflecting said energy, said second surface having a first and a second end position, the first end position of the second surface receiving energy from said signal transmission path, the second end position of said second surface transferring energy from said optical structure to said signal reception path, the focal point on said first surface being located between the first and second end positions thereof.

* * * * *